July 7, 1942.   C. D. PRATT   2,289,318
PROPELLENT FUEL CARTRIDGE
Filed Dec. 14, 1932

Inventor
Carl D. Pratt

By Samuel Herrick,
Attorney

Patented July 7, 1942

2,289,318

UNITED STATES PATENT OFFICE 2,289,318

PROPELLENT FUEL CARTRIDGE

Carl D. Pratt, Tamaqua, Pa., assignor to Atlas Powder Company, Wilmington, Del., a corporation of Delaware Application December 14, 1932, Serial No. 647,267

11 Claims. (Cl. 102—12)

This invention relates to new and useful improvements in substantially solid propellent fuel cartridges and more particularly those used as the source of power for the operation of prime-movers, as, for example, internal combustion engines, motor starters, switch-closers, etc.

By the term "solid fuel" as used herein, I distinguish merely between fuels in solid form in contradistinction to those that are of a liquid or gaseous nature and irrespective of whether the solid fuel is in one piece or in a number of pieces, as for example, in pelleted form.

Broadly, the principal objects of this invention are the overcoming of difficulties that have heretofore existed with previous types of pressure generating and delivering propellent fuel cartridges, used for such purposes, and the provision of an improved type of propellent fuel cartridge, whereby much more reliable, safe and practicable results are obtainable than previously were considered possible in the operation of a device, as for example a movable piston in a cylinder, capable of transforming the energy of a substantially solid propellent fuel, as for example colloided nitrocellulose and the like, into useful work. More specifically, my chief object is the provision of a means, whereby the initial pressure against the movable element or elements of a prime-mover will be exerted by the fuel cartridge in a more gradual manner than has heretofore been possible. Another object is the reduction of the likelihood of the propellent fuel being extinguished, after once being ignited in the system of a prime-mover. Some of the difficulties inherent in the provision of a truly reliable, substantially shockless, pressure producing unit will be apparent from a consideration of the following:

In a prime-mover, to be actuated by means of a propellent explosive fuel, it is almost invariably the case that the relation between the inertia to be overcome and the amount of the fuel charge employed differs materially from that involved with fire-arms, cannon, etc.; the inertia of the pressure-receiving movable part or parts being relatively large and the fuel charge being relatively small with the said relatively heavy movable element or elements moving at a substantially slower speed and through a more limited distance. It is therefore evident that the pressure against the said movable element or elements in a prime-mover, as generated by a propellent fuel charge, must be exerted in a gradual manner to avoid excessively high pressures in the system. Toward this end, it is necessary to employ a relatively slow burning propellent fuel, which is considerably slower in burning speed than propellents used in like amounts, as charges in fire-arms. Further, it has almost invariably been found necessary to provide a shock-absorbing space between the fuel charge and the pressure-receiving element, which helps to reduce the burning speed of the propellent fuel and the operating pressure curve of the system.

In previous attempts to operate a prime-mover by means of propellent fuels,—even with the aid of the above described methods of pressure control,—there has always existed, however, an objectionable initial jolt or sudden surge of pressure against the movable element or elements of the prime-mover, which results in an excessively high peak pressure in the system prior to the overcoming of the inertia of the pressure receiving element or elements. My copending application Serial No. 647,268 discloses a method whereby this very objectionable defect may be practically corrected by employing a novel type of fuel-kindling element,—and especially if employed in conjunction with vented or weakened cartridge envelopes, as hereinafter set forth.

In accordance with my present invention, I so adapt a propellent fuel charge, adaptable for the actuation of a prime-mover, that the pressure generated by the said fuel charge flows freely progressively and over a considerably sustained period, into the system and against the pressure-receiving movable element or elements of the prime-mover, such as a piston, from the moment that the said fuel charge is initiated. By means of this novel element of control, I am able to obtain remarkably improved operation of a prime-mover actuated by means of a substantially solid propellent fuel, as manifested by materially lower peak pressures in the system and by less violent action of the movable element or elements. This is especially evident, for example, in a prime-mover whose movable element moves some distance before engaging the main load of inertia, as for example in an internal combustion engine starter, the piston of which moves forward to engage the clutch attached to a motor. In such case, the inertia of the piston, before it engages the clutch of the motor, is small enough to be overcome too quickly, without my novel means of control; the piston being thrown too violently and often with damaging force against the clutch.

Several means are available for adapting my invention to propellent fuel cartridges, exemplary types of which are as follows:

1. A cartridge envelope containing the fuel charge that is vented to permit an immediate flow of pressure from the cartridge as soon as the fuel charge is ignited.

2. A cartridge envelope containing the fuel charge, that is sufficiently weak to break out with the slight pressure exerted by the fuel kindling element.

3. A fuel charge, without any confining envelope at all; the fuel itself being molded to form a cartridge unit.

4. A cartridge envelope containing the fuel charge, which comprises an inflammable portion in the vicinity of the igniting element, so adapted that the ignition element ignites this inflammable portion of the confining envelope at about the same time that the main fuel charge is ignited; the said inflammable portion burning away to vent the cartridge and permit the free flow of pressure from the cartridge concurrently with the ignition of the main fuel charge, etc.

By means of my invention, it is possible to more gradually exert pressure against the movable element or elements of a prime-mover, with lower peak pressures involved and therefore less strain on equipment. The volume of shock-absorbing space is also rendered more flexible thereby; permitting the use of a smaller space in a prime-mover system, as described, with a resulting higher power efficiency for a given fuel charge. Another very important advantage arising from my present invention is the marked reduction in the likelihood of the propellent fuel being extinguished at the moment that the confining envelope breaks open to emit the flow of pressure from the cartridge. This trouble is eliminated because there is no sudden bursting open of the cartridge envelope as in cases where considerable pressure is required to vent the envelope to emit the flow of pressure, in which case the ignited fuel is likely to be extinguished.

Non-limiting examples of propellent fuel charges, fabricated in accordance with my invention, are:

1. A shot-gun type of propellent fuel cartridge, closed at the outer end with a perforated, slotted or slit wad.

2. A shot-gun type of propellent fuel cartridge, closed at the outer end with an inflammable wad and initiated by means of an electric match head located near enough to the said wad to ignite it directly.

3. A charge of propellent fuel enclosed in an inflammable bag, and initiated by means of an electric match head located near enough to the said bag to ignite it directly.

4. A charge of propellent fuel, molded in the form of a cartridge into which is built an ignition element, without a confining envelope around said fuel.

It is to be understood that I do not limit myself to any one type or style of propellent fuel cartridge, adaptable for the actuation of a prime-mover, comprising a shock-absorbing space between the said fuel cartridge and the pressure-receiving element or elements of the prime-mover. I prefer, however, on account of convenience, to employ a shot gun shell type of cartridge and for the ignition thereof an electric match-head. In such a type of cartridge, I prefer to embody my invention therein, as described in Examples 1 and 2, above; Example 1 being preferred for the sake of ease of manufacture, and Example 2 being preferred where it is requisite to protect the fuel from moisture.

In the accompanying drawing, I have illustrated physical embodiments of the several described arrangements of main fuel charge, igniters, spaced relationship between cartridge and prime mover, venting of cartridge to permit flow of gases from the moment of ignition of the charge, protection of the charge against moisture, etc. However, it is to be understood that these several examples are merely illustrative and are not intended to be limiting.

In the drawing.

Like numerals designate corresponding parts in all of the figures of the drawing.

Figure 1:
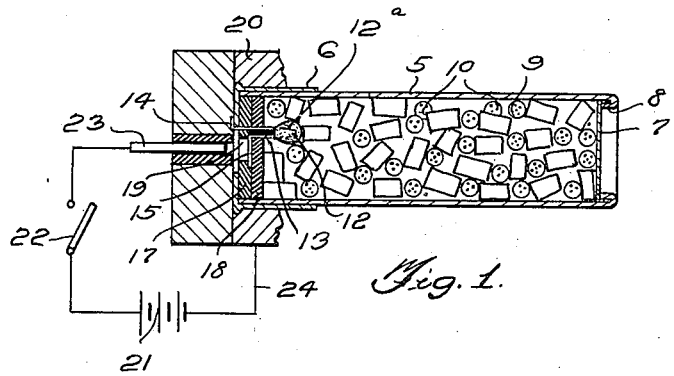
Figure 1 is a sectional view of a cartridge in the nature of a shot gun shell.

The embodiment of the invention illustrated in Fig. 1 comprises a, preferably, paper shell 5 in the nature of a shot gun shell, the inner end of which is closed by the metallic ferrule 6 and the outer end of which is closed by a web or wad of completely consumable material, such as the nitrocellulose film 7; said film being held in place by the crimping of the cartridge, at 8, in a usual and well known way. Contained within the shell is a charge 9 of a relatively slow burning deflagrating material. By deflagrating I mean a material which burns rather than explodes with shock or concussion. This material may advantageously consist of grains of colloided nitrocellulose which grains may be of varying degrees of inflammability, as indicated, for example, by the fact that some of these grains have a larger number of perforations 10 therethrough than others. Further, I contemplate incorporating with the main charge a combustion sustaining substance such as an alkali nitrate or a liquid organic nitrate (nitroglycerine, for example). This combustion sustaining material will be in such limited amount as not to destroy the non-concussive character of the fuel and it is preferably incorporated in some or all of the fuel grains. The use of such a combustion sustaining substance is disclosed in my copending application Serial No. 633,215, filed Sept. 14, 1932.

This material is useful in preventing any tendency of the fuel to be "blown out" as it leaves the shell and enters the relatively large expansion chamber that I preferably employ between the cartridge and the prime mover upon which the evolved gases are to act. The slow burning character of the main fuel charge necessarily carries with it the limitation that the main fuel charge is relatively difficult to ignite and therefore I combine with this difficultly-ignitible main charge a preformed fuse head of hot flash composition indicated at 12.

This match head may be of conventional form as far as the mechanical arrangement of its parts is concerned. That is to say, it is quite common in the art of manufacturing electric detonators, for example, to provide a preformed fuse head in which the ignition of a hot flash composition is brought about by the heating of a fine bridge wire embedded in the hot flash composition; said bridge wire being connected to two metallic strips separated by a paper insulating strip.

In Fig. 1, 13 indicates such a paper insulating strip, 14 one of the metallic terminal strips, and 15 the other of the said metallic terminal strips. The terminal of said strip 14 is connected to the metallic ferrule 6, and the terminal 15 is outturned between the disks 17 and 18 and lies in front of an opening 19. If the cartridge be mounted in a breech block mechanism, indicated diagrammatically at 20, and if said breech mechanism be included in an electric circuit comprising a battery 21, switch 22, and an insulated firing pin 23, it follows that if the firing pin be projected into contact with the outturned end of strip 15, current will flow from the battery through the firing pin 23, strip 15, bridge wire 12a, strip 14, ferrule 6, breech mechanism 20 and conductor 24 back to the battery 21, with the result that the bridge wire will be heated. The flash composition may be like that of the copending application of A. A. Young Serial No. 510,559 filed Jan. 22, 1931, which possesses the desirable characteristics that it will deliver a long sustained flame of considerable volume without any tendency to concussion and a flame which is substantially free of chlorine products. The substance there disclosed, in addition to delivering such a long sustained flame as to effectively ignite the relatively difficultly ignitible colloided nitrocellulose, has the further advantage that it develops but little pressure in proportion to its volume and in proportion to the effective work that it does in the way of igniting colloided nitrocellulose. This is of importance since there would manifestly be no advantage in selecting a material such as colloided nitrocellulose which will burn relatively slowly and consequently deliver its evolved gases gradually and without shock or jar to a prime mover, if we were to use, as an igniter therefor, any substance which would develop such pressure conditions as would result in speeding up the rate of burning of the said colloided nitrocellulose. It is well known that this fuel which might burn relatively slowly under low pressure conditions burns with great rapidity under pressure. Thus, it is clear that we would defeat the very object sought in adopting the slow burning colloided nitrocellulose if we thereafter developed pressure conditions which would speed up its burning.

The whole charge including the main charge of colloided nitrocellulose and the igniting element 12 leaves substantially no ash to clog or interfere with the proper movement of pistons or like prime movers, and the substantial absence of chlorine gases avoids the corrosion of metallic parts heretofore experienced with charges having substantial amounts of chlorine products incorporated therein or evolved therefrom, as recited in my copending application Serial No. 647,268 filed Dec. 14, 1932.

In the form of the invention illustrated in Fig. 1, the wad or web 7 is not perforated, but is designedly made quite thin and weak so that it will easily rupture to permit the escape of the generated gases. Being made of nitrocellulose, this wad will be consumable along with the main charge.

Figure 2:
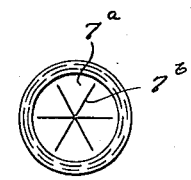
Figure 2 is an end elevation of said cartridge but with the end-wad weakened.
Figure 3:
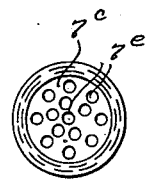
Fig. 3 is an end view of said cartridge showing the retaining wad of the main charge perforated to permit instant escape of the gas and consequently to prevent building up of pressure in the cartridge.

In Fig. 2 I have illustrated that the wad 7a may be further weakened by scoring or cutting the same, as indicated at 7b, while in Fig. 3, I have indicated that the wad or disk 7c may be so constructed as to be wholly non-retentive of evolved gases by being provided with a multiplicity of perforations 7e. Where a perforated wad is employed, I may, if desired, in order to protect the main charge from any possible entry of moisture, utilize a cap 26 upon the end of the shell which would be removed before slipping the shell into the breech mechanism.

Figure 4:
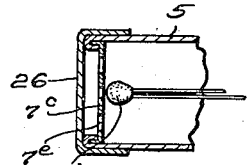
Figure 4 is a view like Fig. 3 illustrating a protective cap upon the end of the cartridge which prevents the entry of moisture until the time of use arrives.

I also contemplate locating the ignition medium 12b at the forward end of the shell, as indicated in Fig. 4, so that the instant the igniting medium sets off the main charge 9 the wad, whether it be the wad of Figs. 1, 2 or 3, will be instantly ignited and consumed, thereby further guarding against the building up of any internal pressure in the shell. Thus, it will be seen that I contemplate the local ignition of the charge either from the front or the rear with the progressive burning of said charge from the point of ignition.

Figure 5:
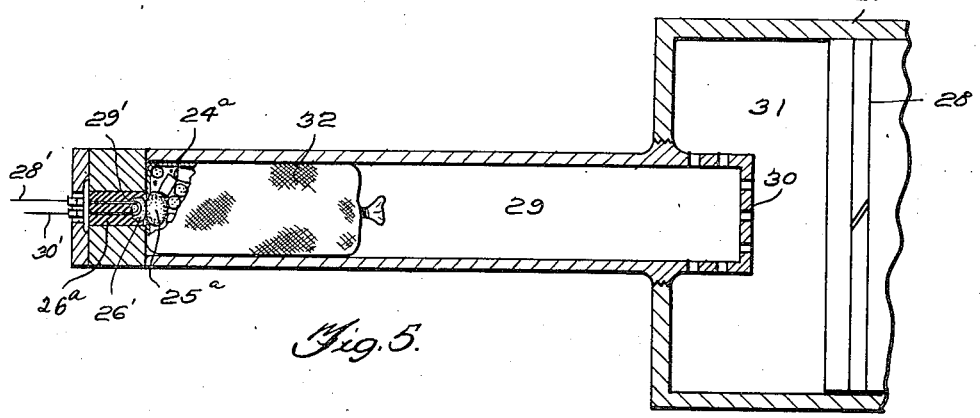
Figure 5 is a sectional view illustrating the main charge as being contained within a silk or other fabric bag and associated with an igniting element and disposed in spaced relation to the prime mover to be actuated.

In Fig. 5, I have indicated a cylinder 27 with a piston 28 therein, said piston constituting the prime mover to be actuated. A pressure chamber 29 projects into the cylinder 27 and is provided with a perforated or screen like portion 30 through which evolved pressure gases are delivered into the expansion chamber 31 lying in front of the piston, so that the pressure applied to the piston will build up relatively gradually.

In this particular embodiment of the invention, I have shown the main charge as being located in a bag 32, which may be of silk or any other suitable material and which has incorporated therein a body of deflagrating fuel 24a as described and a body of hot flash composition 25a adapted to be set off by the ignition of a like body of hot flash composition 26'; the latter being mounted in a shell 26a. This element may be fired electrically through leads 28' and 30' and bridge wire 29'.

Figure 6:
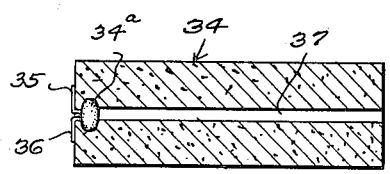
Fig. 6 is a detailed sectional view illustrating a main charge formed of one piece and having built thereinto an igniting medium.

In Fig. 6 I have illustrated a fuel charge consisting of a one-piece pellet 34 which has incorporated therein a body of hot flash composition 34a like that described with respect to Figs. 1, 4 and 5 and which may be fired through proper electrical connections, not shown, contacting with the bridge wire terminals 35 and 36. The pellet 34 may have a channel or passageway 37 formed therethrough to permit the gas generated when the pellet is locally ignited to pass forwardly through the pellet, the rate of burning being determined by the area of the surface exposed, this in turn being determined by the size and shape of the channel 37.

Having described my invention, what I claim is:
1. For the actuation of the movable element of a prime mover system comprising a breech mechanism and an expansion chamber between the breech mechanism and said movable element, a projectile-free propellent fuel cartridge dimensioned to fit and be fired in said breech mechanism and comprising a body of substantially solid, granular self-combustive, deflagrating fuel of such nature that its rate of burning increases with increase in pressure, said fuel being of such shape and size and its speed of burning being such that a part of the said fuel will be ejected from said cartridge in a solid, burning but non-consumed condition and under the influence of the initial gases of combustion, the said cartridge being vented to permit the substantially free flow of gas from the cartridge from the moment that the said deflagrating fuel is ignited.

2. For the actuation of the movable element of a prime mover system comprising a breech mechanism and an expansion chamber between the breech mechanism and said movable element, a projectile-free propellent fuel cartridge dimensioned to fit and be fired in said breech mechanism and comprising a body of substantially solid, granular self-combustive, deflagrating fuel of such nature that its rate of burning increases with increase in pressure, said fuel being of such shape and size and its speed of burning being such that a part of the said fuel will be ejected from said cartridge in a solid, burning, but non-consumed condition and under the influence of the initial gases of combustion, and means for temporarily retaining said fuel in said cartridge, said means being vented whereby a substantially free flow of gas from the cartridge is permitted from the moment that the said deflagrating fuel is ignited and before the creation of enough pressure within the cartridge to materially increase the rate of burning of said fuel.

3. For the actuation of a movable element of a prime mover system comprising a breech mechanism and an expansion chamber between the breech mechanism and said movable element, a projectile-free propellent fuel cartridge dimensioned to fit and be fired in said breech mechanism and to have its propellent charge discharged, at least in part, while still in a solid state, into said expansion chamber and there burned, said cartridge containing a body of pelleted nitrocellulose of such inflammability as to render said nitrocellulose pellets deflagrating and substantially non-explosive under the conditions of use, and said pellets being of such size and shape that a material portion of them will be blown under the influence of the initial gases of combustion in a burning, but still solid form, from the cartridge, said cartridge being vented to permit the free flow of the gases of combustion therefrom from the moment of ignition.

4. For the actuation of the movable element of a prime mover system comprising a breech mechanism and an expansion chamber between the breech mechanism and said movable element, a projectile-free propellent fuel cartridge dimensioned to fit and be fired in said breech mechanism and comprising a body of substantially solid, granular, self-combustive, deflagrating fuel of such nature that its rate of burning increases with increase in pressure, said fuel being of such shape and size and its speed of burning being such that a part of the said fuel will be ejected from said cartridge in a solid, burning, but non-consumed condition and under the influence of the initial gases of combustion, into said expansion chamber and toward the movable element of the prime mover, and a retaining means for holding the fuel in the cartridge, said retaining means being perforated to permit the substantially free flow of gas from the cartridge from the moment that the said deflagrating fuel is ignited.

5. For the actuation of the movable element of a prime mover system comprising a breech mechanism and expansion chamber between the breech mechanism and said movable element, a projectile-free propellent fuel cartridge dimensioned to fit and be fired in said breech mechanism and comprising a body of substantially solid, granular, self-combustive, deflagrating fuel of such nature that its rate of burning increases with increase in pressure, said fuel being of such shape and size and its speed of burning being such that a part of the said fuel will be ejected from said cartridge in a solid, burning, but non-consumed condition and under the influence of the initial gases of combustion, and a wad closing the front end of said cartridge and having openings therethrough to vent the cartridge in such manner as to permit the substantially free flow of gas from the cartridge from the moment that the said deflagrating fuel is ignited.

6. For the actuation of the movable element of a prime mover system comprising a breech mechanism and an expansion chamber between the breech mechanism and said movable element, a projectile-free propellent fuel cartridge dimensioned to fit and be fired in said breech mechanism and comprising a body of substantially solid, granular, self-combustive, deflagrating fuel of such nature that its rate of burning increases with increase in pressure, said fuel being of such shape and size and its speed of burning being such that a part of the said fuel will be ejected from said cartridge in a solid, burning, but non-consumed condition, and under the influence of the initial gases of combustion, into said expansion chamber and toward the movable element of the prime mover, an inflammable wad at the front end of said cartridge for holding the fuel therein and igniting means for the fuel disposed in such proximity to said wad as to consume the same to vent the cartridge from the moment of ignition of the fuel and before the creation of enough pressure within the cartridge to materially increase the rate of burning of said fuel.

7. A cartridge comprising a projectile-free shell, a propulsive type fuel therein comprising a body of pelleted nitrocellulose of such inflammability as to render said nitrocellulose pellets deflagrating and substantially non-explosive under the conditions of use, said pellets being of such size and shape and combustibility that at least a part of them will be blown under the influence of the initial gases of combustion in a burning, but still solid form, from the cartridge shell, and closure means at the forward end of the shell, said closure means being vented to permit the free flow of the gases of combustion from the shell from the moment of ignition of the fuel while holding said fuel in place in the shell until the time of use.

8. A propellent fuel cartridge comprising a body of substantially solid, granular self combustible, deflagrating fuel of such nature that its rate of burning increases with increase of pressure and of such shape and size and combustibility that at least a part of the said fuel charge when ignited will be blown from the cartridge in a burning but still solid form, an igniting means for the fuel comprising a flash composition materially more inflammable than the said fuel, said igniting means being positioned adjacent to the base of the cartridge and a container for the fuel and the flash composition, an end closure for said container rupturable to release said fuel, under the influence of the pressure of the flash composition and independently of the pressure developed by the fuel.

9. A projectile-free, propellent fuel cartridge comprising a substantially solid, granular, self-combustive, deflagrating main fuel charge of such shape and size and combustibility that at least part of the said fuel charge will be blown from the cartridge under the influence of the initial gases of combustion in a burning but still solid form; a fuel kindling element within said cartridge and a closure at the forward end of said cartridge, said closure comprising venting means responsive to the heat and/or pressure developed by the fuel kindling element and independent of the heat and pressure generated by said main fuel charge, for venting the same to allow a flow of gas therefrom at least from the moment that the said fuel charge is ignited and before the creation of enough pressure within the cartridge to materially increase the rate of burning of said fuel.

10. A projectile-free, propellent fuel cartridge comprising a substantially solid, granular, self-combustive, deflagrating fuel charge of such shape and size and combustibility and a shell so constructed that at least a part of the said fuel charge, when ignited will be blown from the said shell in a burning but still solid form, and a fuel kindling element adjacent the base of the cartridge with respect to the major portion of the fuel charge, a closure at the forward end of said cartridge comprising venting means responsive to the heat and/or pressure developed by the fuel kindling element and independent of the heat and pressure generated by said fuel charge, for venting the cartridge at least from the moment that the said fuel charge is ignited.

11. For the actuation of a movable element of a prime mover system comprising a cartridge firing means and an expansion chamber leading to said movable element from the cartridge firing means, a projectile-free, propellent fuel cartridge adapted to be fired in the cartridge firing means and comprising a substantially solid, granular, self-combustive, deflagrating main fuel charge of such shape and size and combustibility that at least a part of the said fuel charge will be blown from the cartridge under the influence of the initial gases of combustion in a burning but still solid form, and a fuel kindling element, said element comprising a preformed fuse head adjacent the base of the cartridge with respect to the major portion of the fuel charge, a closure at the forward end of said cartridge comprising venting means responsive to the heat and/or pressure developed by the fuel kindling element and independent of the heat and pressure generated by said deflagrating main fuel charge for venting the cartridge to allow a flow of gas therefrom, at least from the moment that the said fuel charge is ignited and before the creation of enough pressure within the cartridge to materially increase the rate of burning of said fuel.

CARL D. PRATT.